United States Patent
Aoto et al.

(10) Patent No.: US 12,034,643 B2
(45) Date of Patent: Jul. 9, 2024

(54) COMMUNICATION DEVICE FOR RECEIVING DATA FROM TRANSMISSION TERMINAL USING CONNECTIONLESS PROTOCOL

(71) Applicant: DAIKIN INDUSTRIES, LTD., Osaka (JP)

(72) Inventors: Wataru Aoto, Osaka (JP); Yuki Murakami, Osaka (JP); Satoshi Yoshikawa, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/674,664

(22) Filed: Feb. 17, 2022

(65) Prior Publication Data

US 2022/0174020 A1     Jun. 2, 2022

Related U.S. Application Data

(63) Continuation of application No. PCT/JP2020/032944, filed on Aug. 31, 2020.

(30) Foreign Application Priority Data

Aug. 29, 2019 (JP) .................................. 2019-157113

(51) Int. Cl.
| | | |
|---|---|---|
| *H04L 47/30* | (2022.01) | |
| *H04L 47/19* | (2022.01) | |
| *H04L 69/164* | (2022.01) | |

(52) U.S. Cl.
CPC ............ *H04L 47/30* (2013.01); *H04L 47/196* (2013.01); *H04L 69/164* (2013.01)

(58) Field of Classification Search
CPC ..... H04L 47/30; H04L 47/196; H04L 69/164; H04L 65/40; H04L 67/12; H04L 69/16
See application file for complete search history.

(56) References Cited

U.S. PATENT DOCUMENTS

| | | | |
|---|---|---|---|
| 6,560,199 B1 | 5/2003 | Hoshino | |
| 7,558,872 B1 | 7/2009 | Senevirathne et al. | |
| 2005/0177657 A1* | 8/2005 | Pope | ..................... G06F 13/385 710/36 |
| 2006/0155841 A1 | 7/2006 | Okude et al. | |

(Continued)

FOREIGN PATENT DOCUMENTS

| | | | | |
|---|---|---|---|---|
| EP | 1471707 A2 * | 10/2004 | ....... | H04L 29/06027 |
| EP | 1 471 707 B1 | 1/2007 | | |

(Continued)

OTHER PUBLICATIONS

International Preliminary Report of corresponding PCT Application No. PCT/JP2020/032944 dated Mar. 10, 2022.

(Continued)

*Primary Examiner* — Thinh D Tran
(74) *Attorney, Agent, or Firm* — Global IP Counselors, LLP (57) ABSTRACT

A communication device receives, using a connectionless protocol, data transmitted by a transmission terminal. The communication device determines, in accordance with a receivable size of the communication device, a data transmission request in order to receive the data from the transmission terminal.

15 Claims, 5 Drawing Sheets

(56) References Cited

U.S. PATENT DOCUMENTS

| | | | | |
|---|---|---|---|---|
| 2007/0156955 A1* | 7/2007 | Royer | ................... | G06F 13/387 |
| | | | | 711/113 |
| 2012/0158988 A1* | 6/2012 | Fatehpuria | ....... | H04N 21/44004 |
| | | | | 709/234 |
| 2017/0279725 A1* | 9/2017 | Lee | ....................... | H04L 47/193 |
| 2019/0132765 A1* | 5/2019 | Cho | ...................... | H04W 28/16 |

FOREIGN PATENT DOCUMENTS

| | | |
|---|---|---|
| JP | 5-327776 A | 12/1993 |
| JP | 2000-216819 A | 8/2000 |
| JP | 2001-268114 A | 9/2001 |
| JP | 2004-343701 A | 12/2004 |
| JP | 2006-114973 A | 4/2006 |
| JP | 2007-13675 A | 1/2007 |
| JP | 2007-327656 A | 12/2007 |
| JP | 2008-85467 A | 4/2008 |
| JP | 2008-85822 A | 4/2008 |
| JP | 2009-141565 A | 6/2009 |
| JP | 2012-216104 A | 11/2012 |
| JP | 2015-162139 A | 9/2015 |
| JP | 2017-69661 A | 4/2017 |
| WO | 2004/077741 A1 | 9/2004 |

OTHER PUBLICATIONS

European Search Report of corresponding EP Application No. 20 85 9396.2 dated Sep. 16, 2022.
International Search Report of corresponding PCT Application No. PCT/JP2020/032944 dated Nov. 17, 2020.

* cited by examiner

COMMUNICATION DEVICE FOR RECEIVING DATA FROM TRANSMISSION TERMINAL USING CONNECTIONLESS PROTOCOL

CROSS-REFERENCE TO RELATED APPLICATIONS

This is a continuation of International Application No. PCT/JP2020/032944 filed on Aug. 31, 2020, which claims priority to Japanese Patent Application No. 2019-157113, filed on Aug. 29, 2019. The entire disclosures of these applications are incorporated by reference herein.

BACKGROUND

Field of Invention

The present disclosure relates to a communication device that receives data by using a connectionless protocol.

Background Information

In communication using a connectionless protocol, occurrence of an overflow of a reception buffer may decrease communication efficiency. Accordingly, there is a device for detecting an overflow of a reception buffer, as in Japanese Unexamined Patent Application Publication No. 2001-268114.

SUMMARY

A communication device of a first aspect is communication device the receives, using a connectionless protocol, data transmitted by a transmission terminal. The communication device determines, in accordance with a receivable size of the communication device, a data transmission request in order to receive the data from the transmission terminal.

DETAILED DESCRIPTION OF EMBODIMENT(S)

Hereinafter, a communication system 100 according to an embodiment of the present disclosure will be described. The following embodiments are specific examples, do not limit the technical scope, and can be changed as appropriate without deviating from the gist.

Hitherto, in a network in which a plurality of transmission terminals are connected to a single communication device, a connectionless protocol such as a user datagram protocol (UDP) has been used. Specifically, in a network using a connectionless protocol, a communication device first transmits a transmission request to a plurality of transmission terminals connected to the network. Subsequently, each transmission terminal that has received the data transmission request autonomously transmits data to the communication device as a requester. A transmission method in which a communication device transmits a transmission request to a plurality of transmission terminals is one-to-one communication or one-to-many communication of transmitting a data transmission request to every transmission terminal connected to the network, or special one-to-many communication of transmitting a data transmission request only to a selected transmission terminal.

In such a network using a connectionless protocol, for example, if a single communication device communicates with a plurality of transmission terminals in one-to-one communication, the communication device may simultaneously receive a large amount of data from the plurality of transmission terminals, and an overflow may occur in a reception buffer that temporarily stores the received data. In a case where such a communication device is a store-and-forward communication device, which has been the mainstream in recent years, and receives data larger than a receivable size of the reception buffer of the communication device, the data is discarded and completely lost. The invention of the present disclosure described below provides a communication device that prevents such data loss and that suppresses an overflow of a reception buffer or the like so that the communication device efficiently communicates with a plurality of transmission terminals.

First Embodiment (1) Overall Configuration

Figure 1:
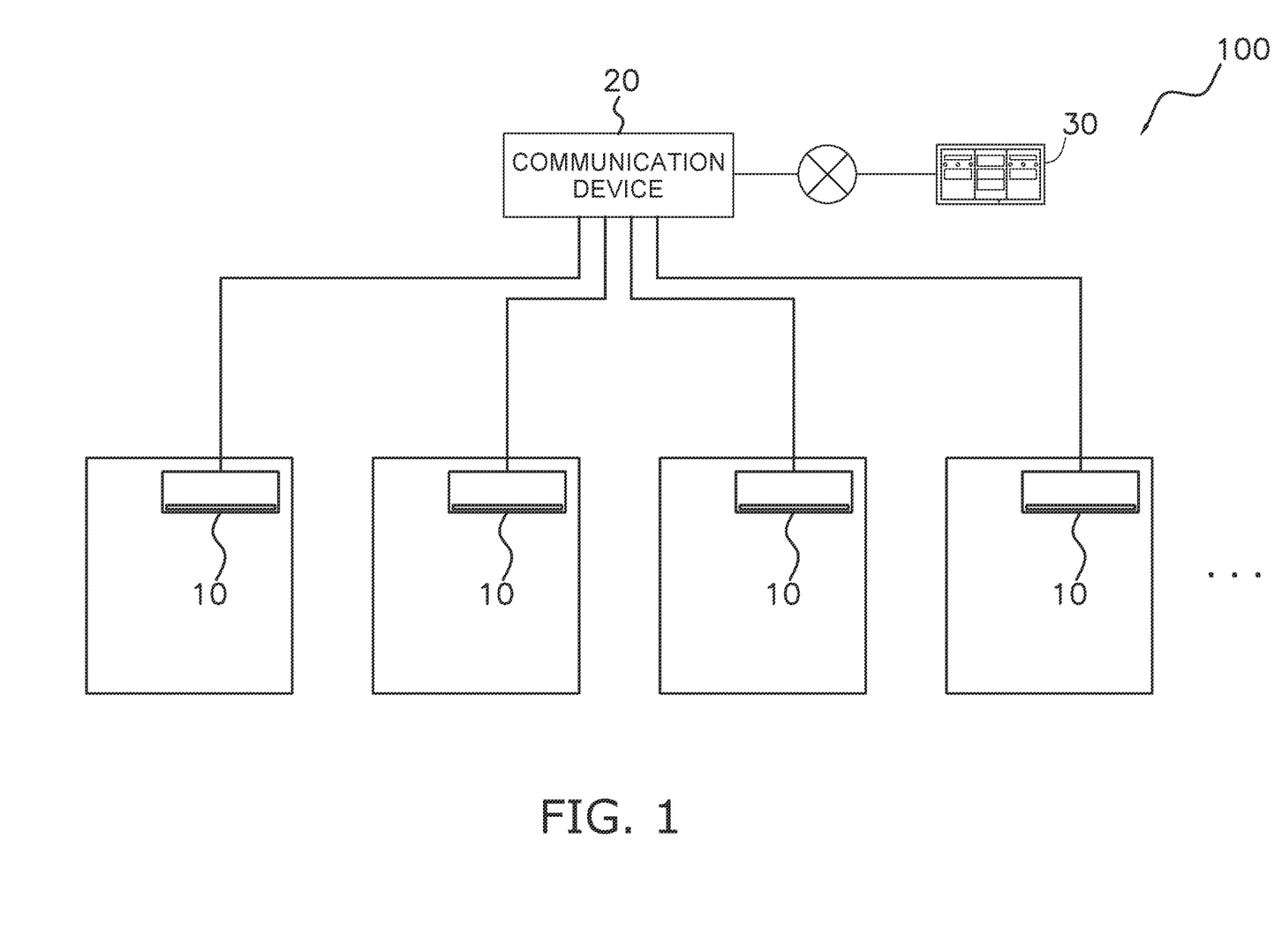
FIG. 1 illustrates a schematic configuration of a communication system of a first embodiment.

The communication system 100 of a first embodiment illustrated in FIG. 1 includes a single communication device 20 and a plurality of (herein, four) transmission terminals 10. For convenience of description, it is assumed that the plurality of transmission terminals 10 are substantially the same. The communication device 20 and each of the plurality of transmission terminals 10 are connected to each other via a network. In the present embodiment, the communication device 20 and each of the transmission terminals 10 are connected to each other via a wired network, but the manner of connection is not limited thereto. Communication between the communication device 20 and each of the transmission terminals 10 is performed by using a connectionless protocol. The connectionless protocol is, for example, a UDP.

(2) Detailed Configuration (2-1) Transmission Terminal 10

Each transmission terminal 10 is, for example, a device such as an air conditioner. An air conditioner as the transmission terminal 10 collects, for example, various data such as operation data about the air conditioner, data of an environment around the air conditioner, and input data input by a user or the like. The transmission terminal 10 transmits the collected various data to the communication device 20 on the basis of a data transmission request from the communication device 20.

The transmission terminal 10 includes a central processing unit (CPU), a memory, various interfaces, various sensors, and so forth, which are not illustrated.

(2-2) Communication Device 20

Figure 2:
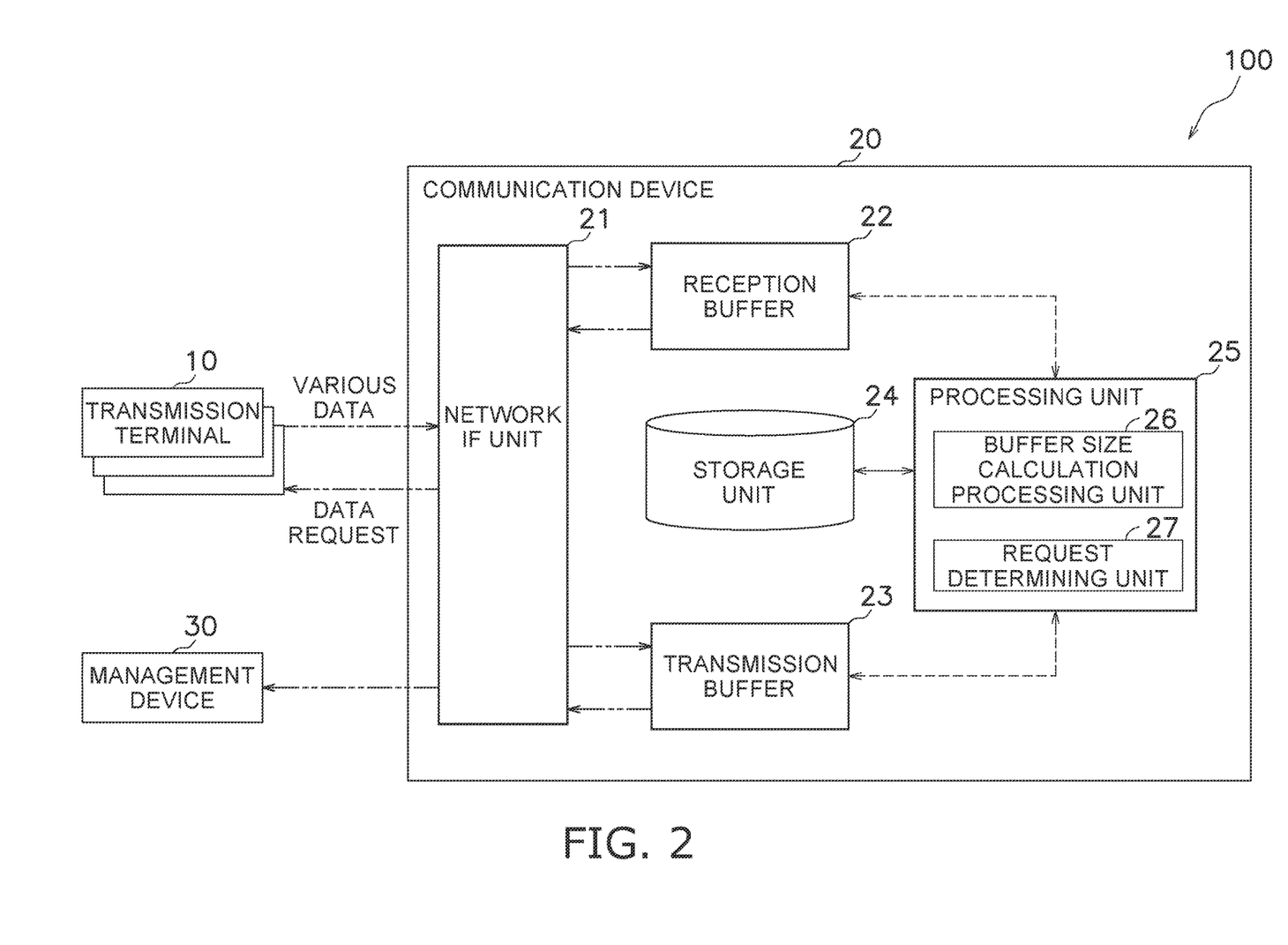
FIG. 2 illustrates a configuration of a communication device of the first embodiment.

FIG. 2 illustrates a schematic configuration of the communication device 20. The communication device 20 includes a network interface (IF) unit 21 that provides an interface for a network, a reception buffer 22 that temporarily stores data received from the individual transmission terminals 10, a transmission buffer 23 that temporarily stores data to be transmitted to the individual transmission terminals 10, a storage unit 24 that stores a data transmission/reception program and so forth, and a processing unit 25 for implementing functions of a program stored in the storage unit 24.

Here, the reception buffer 22 and the transmission buffer 23 may be application buffers of an application included in the communication device 20.

The storage unit 24 includes a read only memory (ROM), a random access memory (RAM), and an external storage device, which are not illustrated. The storage unit 24 stores information, a database, or the like required for implementing functions of a program. Specifically, the storage unit 24 stores information about individual data transmission requests, data sizes of pieces of data to be received on the basis of the individual data transmission requests, a threshold value of a receivable size of the reception buffer, and so forth. The receivable size of the reception buffer is calculated by a buffer size calculation processing unit 26, which will be described below. The threshold value of the receivable size is a value determined by a manager or the like of the communication system 100 at his/her discretion.

The processing unit 25 includes a CPU, which is not illustrated, and controls the entire communication device 20. The processing unit 25 includes the buffer size calculation processing unit 26 and a request determining unit 27.

The buffer size calculation processing unit 26 monitors the reception buffer 22 and performs a process of calculating a receivable size of the reception buffer 22. The receivable size of the reception buffer 22 is the size of data receivable by the reception buffer 22. The buffer size calculation processing unit 26 is calculated by using, for example, a difference between a total memory size of the reception buffer 22, and data sizes of individual pieces of data that are currently stored in the reception buffer 22 and data sizes of individual pieces of data that are currently unreceived and are to be received on the basis of transmitted data transmission requests. The data size of data to be transmitted by each transmission terminal 10 on the basis of a data transmission request is stored in the storage unit 24 in advance.

The request determining unit 27 performs determination regarding a data transmission request to be transmitted to the transmission terminals 10, on the basis of the receivable size calculated by the buffer size calculation processing unit 26. For example, in a case where the receivable size of the reception buffer is smaller than or equal to the threshold value, the request determining unit 27 determines to increase a transmission interval of a data transmission request to be transmitted to the transmission terminals 10.

(3) Operation of Communication Process

Figure 3:
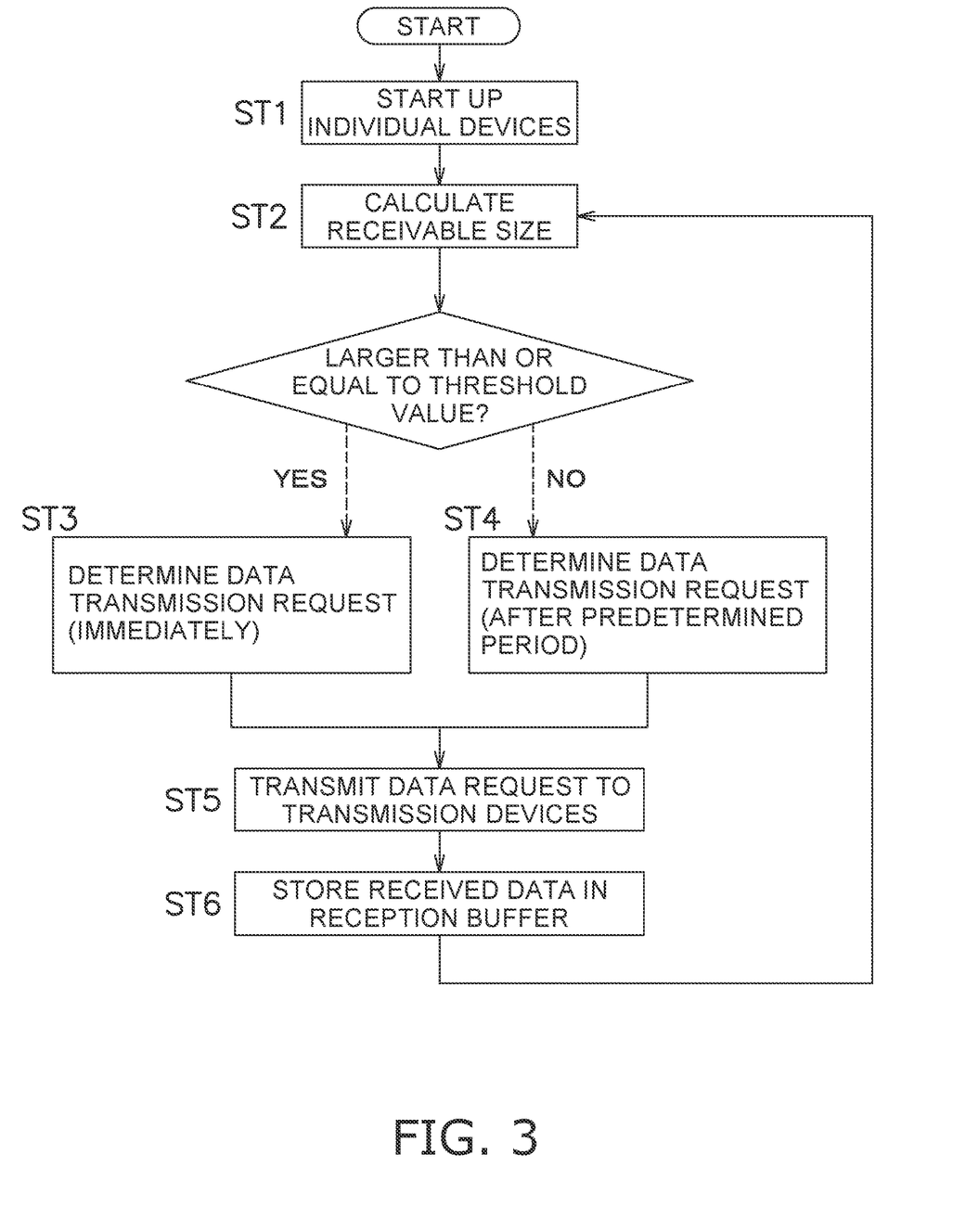
FIG. 3 illustrates operation of a communication process of the first embodiment.

Next, a communication process by the communication device 20 illustrated in the present embodiment will be described with reference to FIG. 3.

First, in step ST1, connections are established in the communication system 100 so that communication can be performed as illustrated in FIG. 1, and the communication device 20 and the individual transmission terminals 10 are started up.

In step ST2, the buffer size calculation processing unit 26 of the communication device 20 calculates a receivable size of the reception buffer 22.

In a case where the receivable size of the reception buffer 22 calculated in step ST2 is larger than a threshold value stored in the storage unit 24, the request determining unit 27 determines, in step ST3, to transmit a data transmission request to the transmission terminals 10.

On the other hand, in a case where the receivable size of the reception buffer 22 calculated in step ST2 is smaller than the threshold value stored in the storage unit, the request determining unit 27 determines, in step ST4, to increase the transmission interval of a data transmission request to be transmitted to the transmission terminals 10. Accordingly, for example, determination is performed to transmit a data transmission request to the transmission terminals 10 after a predetermined period elapses.

In step ST5, the data transmission request determined by the request determining unit 27 is transmitted to the individual transmission terminals 10 via the network IF unit 21. Each transmission terminal 10 that has received the data transmission request transmits various data to the communication device 20 on the basis of the data transmission request.

In step ST6, the communication device 20 receives the various data via the network IF unit 21. The data that has been received is stored as received data in the reception buffer 22.

The series of operations from step ST2 to step ST6 are executed at a predetermined time interval or executed on the basis of a request from a manager or the like of the communication system 100.

(4) Features

The communication device 20 of the first embodiment is the communication device 20 that receives, using a connectionless protocol, data transmitted by the transmission terminal 10. The connectionless protocol is, for example, a UDP. The communication device 20 determines, in accordance with a receivable size of the communication device 20, a data transmission request for receiving data from the transmission terminal 10.

The determining of the data transmission request includes determining of an interval of the data transmission request to the transmission terminal. In a case where the receivable size is smaller than or equal to a threshold value, the communication device increases the interval of the data transmission request to the transmission terminal 10.

The communication device 20 calculates the receivable size on the basis of a size of currently free capacity of the reception buffer 22 and a size of currently unreceived data.

For example, the communication device 20 of a store-and-forward type temporarily stores received data in the reception buffer 22. However, in a case where data larger than the receivable size of the reception buffer 22 is received, the data may be discarded and completely lost. Thus, to perform efficient communication, it is necessary to adjust the data transmission request to be transmitted to each transmission terminal 10 so that data is received within the range of not exceeding the receivable size.

The communication device 20 illustrated in the first embodiment determines, in accordance with the receivable size of the communication device 20, a data transmission request for receiving data from the transmission terminal 10. Thus, received data does not exceed the receivable size. Accordingly, an overflow of the reception buffer 22 can be suppressed and efficient communication can be performed.

(5) Modifications (5-1)

The communication device 20 illustrated in the first embodiment determines, in accordance with the receivable size of the communication device 20, a data transmission request for receiving data from the transmission terminal 10. The data transmission request determined by the communication device 20 may include determination of one or more items of data. The items of data are items of information included in the data transmitted by the transmission terminal 10 on the basis of the data transmission request. For example, in a case where the receivable size is larger than or equal to the threshold value, the communication device 20 transmits, to the transmission terminal 10, a data transmission request requesting data about operation data, environment data, and input data of an air conditioning device as the transmission terminal 10. On the other hand, in a case where the receivable size is smaller than or equal to the threshold value, the communication device 20 transmits, to the transmission terminal 10, a data transmission request requesting only data about operation data of the air conditioning device. In other words, in a case where the receivable size is smaller than or equal to the threshold value, the communication device 20 reduces the number of items of data.

A data transmission request to be transmitted to the transmission terminal 10 in a case where the receivable size is larger than or equal to the threshold value, and a data transmission request to be transmitted to the transmission terminal 10 in a case where the receivable size is smaller than or equal to the threshold value may be stored in advance in the storage unit 24 of the communication device 20. Alternatively, each item of data may have a degree of priority set thereto. The communication device 20 transmits items of data to the transmission terminal 10 in order from the item having the highest priority such that the size of received data does not exceed the receivable size.

Accordingly, the size of data to be received is reduced, so that the received data does not exceed the receivable size.

(5-2)

The communication device 20 illustrated in the first embodiment may be connected to a device other than the transmission terminals 10 (management device 30) via the network, as illustrated in FIG. 1. The communication device 20 has a function of transmitting received data to the management device 30 via the network. The network herein may be wired or wireless. Communication between the communication device 20 and the management device 30 may be communication using a protocol other than a connectionless protocol. In this case, the communication device 20 has a program of converting received data. Conversion of received data may be performed by the processing unit 25 illustrated in FIG. 2.

Transmission data to be transmitted to the management device 30 is temporarily stored in the transmission buffer 23. The transmission data is substantially the same as the data received from the transmission terminal 10, but is referred to as transmission data herein for convenience. The transmission data may be data obtained by processing data received from the transmission terminal 10 by the processing unit 25.

The buffer size calculation processing unit 26 of the communication device 20 may calculate a size of free capacity of the transmission buffer 23. The size of free capacity of the transmission buffer 23 can be calculated by using a difference between a total memory size of the transmission buffer 23 and the data size of the transmission data currently stored in the transmission buffer 23. The total memory size of the transmission buffer 23 and the data size of the transmission data to be transmitted to each transmission terminal 10 may be stored in the storage unit 24. The communication device 20 may determine a data transmission request to the transmission terminal 10 in accordance with the size of free capacity of the transmission buffer 23 in addition to the receivable size of the reception buffer 22.

Accordingly, an overflow of the transmission buffer 23 of the communication device 20 can be suppressed, and efficient communication can be performed.

Second Embodiment (1) Overall Configuration

A communication system 200 of a second embodiment includes elements that are substantially the same as those of the communication system 100 of the first embodiment. The elements of the communication system 200 are denoted by reference numerals in the 200s as illustrated in FIG. 4.

Figure 4:
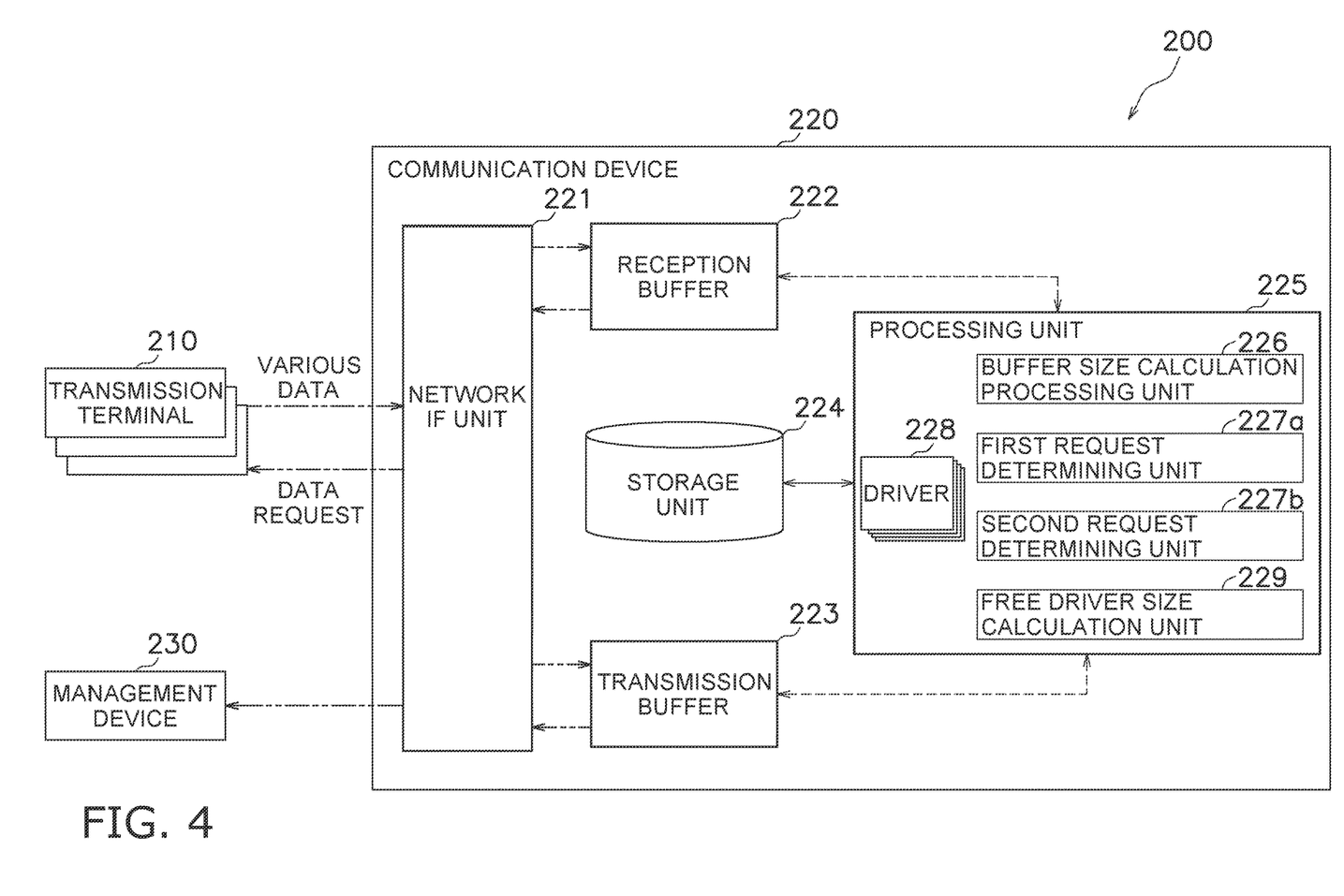
FIG. 4 illustrates a configuration of a communication device of a second embodiment.

The communication system 200 of the second embodiment illustrated in FIG. 4 includes a single communication device 220, a plurality of (herein, four) transmission terminals 210, and a management device 230. The communication device 220 and each of the plurality of transmission terminals 210 are connected to each other via a network. In the second embodiment, the communication device 220 and each of the transmission terminals 210 are connected to each other via a wired network, but the manner of connection is not limited thereto. Communication between the communication device 220 and each of the transmission terminals 210 is performed by using a connectionless protocol. The connectionless protocol is, for example, a UDP. The transmission terminals 210 and the management device 230 of the second embodiment have substantially the same configurations as those of the transmission terminals 10 and the management device 30 of the first embodiment, and thus the description thereof is omitted.

(2) Communication Device 220

FIG. 4 illustrates a schematic configuration of the communication device 220. The communication device 220 includes a network IF unit 221 that provides an interface for a network, a reception buffer 222 that temporarily stores data received from the individual transmission terminals 210, a transmission buffer 223 that temporarily stores data to be transmitted to the individual transmission terminals 210, a storage unit 224 that stores data received from the individual transmission terminals 210 a data transmission/reception program and so forth, and a processing unit 225 for implementing functions of a program stored in the storage unit 224.

The storage unit 224 includes a ROM, a RAM, and an external storage device, which are not illustrated, and stores, like the storage unit of the first embodiment, information, a database, or the like required for implementing functions of a program. The storage unit 224 also stores, for example, information such as an upper limit value of the number of drivers that execute a data transmission request among a plurality of drivers included in the processing unit 225.

The processing unit 225 includes a CPU, which is not illustrated, and controls the entire communication device 220. The processing unit 225 includes a buffer size calculation processing unit 226 and a first request determining unit 227a (the request determining unit 27 in the first embodiment), and also includes a plurality of drivers 228, a free driver calculation processing unit 229, and a second request determining unit 227b.

The drivers 228 at least execute a data transmission request determined by the first request determining unit 227a and/or the second request determining unit 227b and execute a process of receiving data transmitted from the individual transmission terminals 210 to the communication device 220 on the basis of the data transmission request. Here, the driver 228 that is executing a process of receiving data is referred to as an executing driver, and a driver that is not executing a process of receiving data is referred to as a free driver. Among the plurality of drivers, drivers 228 the number of which exceeds the upper limit value of the number of drivers 228 executing the data transmission request (executing drivers) stored in the storage unit 224 are incapable of simultaneously executing a process.

The free driver calculation processing unit 229 monitors the drivers 228 and performs a process of calculating the number of free drivers at a predetermined timing set in advance. When the calculated number of free drivers is zero, the free driver calculation processing unit 229 performs again a process of calculating the number of free drivers after a predetermined time set in advance elapses.

The second request determining unit 227b performs determination regarding a data transmission request to be transmitted to the transmission terminals 210, on the basis of the number of free drivers calculated by the driver calculation processing unit 229. For example, in a case where the number of free drivers is smaller than the upper limit value of the number of executing drivers stored in the storage unit 224, the second request determining unit 227b determines to cause one or a plurality of free drivers to execute a data transmission request. On the other hand, in a case where the number of free drivers is zero (none), the request determining unit 27 determines not to transmit a data transmission request so as not to receive data.

(3) Operation of Communication Process

Figure 5:
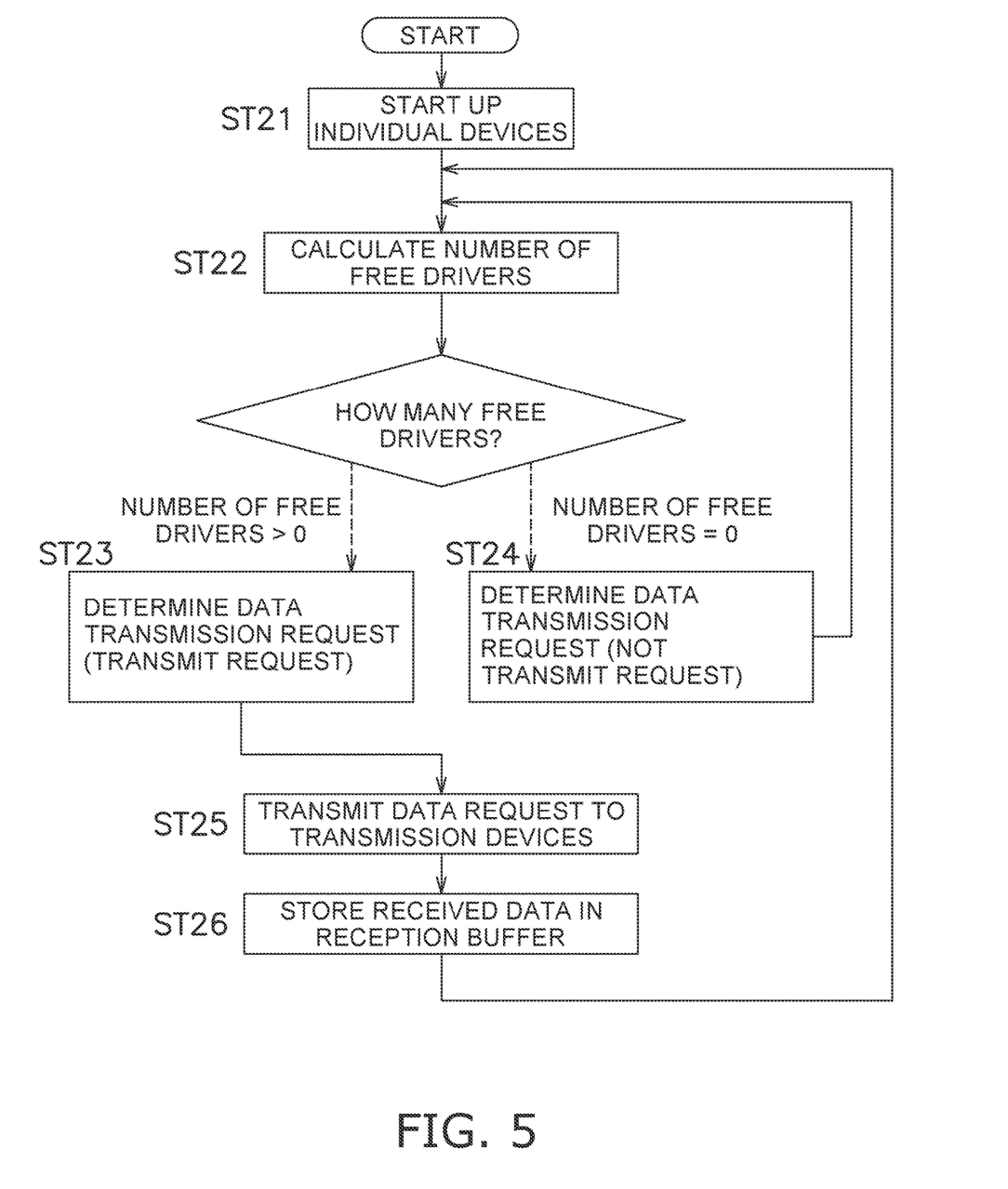
FIG. 5 illustrates operation of a communication process of the second embodiment.

Next, a communication process by the communication device 220 illustrated in the second embodiment will be described with reference to FIG. 5. The communication device 220 illustrated in the second embodiment may perform, at the same time as the communication process, the communication process of the communication device 20 illustrated in the first embodiment.

First, in step ST21, the transmission terminals 210 and the communication device 220 are started up in a state of being connected so as to be capable of communicating with each other.

In step ST22, the free driver calculation processing unit 229 of the communication device 220 calculates the number of free drivers.

In a case where the number of free drivers calculated in step ST22 is smaller than the upper limit value of the number of executing drivers stored in the storage unit 224 (0< the number of free drivers < the upper limit value of the number of executing drivers), the second request determining unit 227b determines, in step ST23, to cause one or a plurality of free drivers to execute a data transmission request. The data transmission request determined at this time is determined on the basis of a degree of priority of an item of data and/or an interval of the data transmission request of the transmission terminal like the data transmission request in the communication system 100 of the first embodiment.

On the other hand, in a case where the number of free drivers calculated in step ST22 is zero (0=the number of free drivers), the second request determining unit 227b determines, in step ST24, not to transmit a data transmission request so as not to receive data. At this time, the free driver calculation processing unit 229 calculates again the number of free drivers after a predetermined time elapses, and the second request determining unit 227b determines to cause a free driver to execute a data transmission request, as in step ST22 and step ST23.

In step ST5, the data transmission request determined by the second request determining unit 227b is transmitted to each transmission terminal 210 via the network IF unit 221. Each transmission terminal 210 that has received the data transmission request transmits various data to the communication device 220 on the basis of the data transmission request.

In step ST26, the communication device 220 receives the various data via the network IF unit 221. The data that has been received is stored as received data in the reception buffer 222.

The received data can be, for example, transmitted to the management device (another device) 230. At this time, the communication device 220 determines a data transmission request to the transmission terminals 210 in accordance with a size of free capacity of the transmission buffer 223.

(4) Features (4-1)

The communication device 220 of the second embodiment holds the plurality of drivers 228 that at least execute a process of receiving data. A data transmission request is determined on the basis of the number of free drivers that are not executing the process of receiving the data among the plurality of drivers 228. The communication device sets an upper limit of the number of drivers that execute the data transmission request. In a case where the number of free drivers is zero, the communication device 220 determines a data transmission request so as not to receive data. In this case, the communication device 220 confirms again the number of free drivers after a predetermined time elapses. The data transmission request is determined on the basis of a degree of priority of an item of the data and/or an interval of the data transmission request of the transmission terminal.

The communication device 220 of the second embodiment has a function of transmitting the received data to another device 230 via the network. The communication device 220 determines the data transmission request to the transmission terminal 210 in accordance with a size of free capacity of the transmission buffer 223.

Accordingly, the communication device 220 is capable of efficiently communicating with each transmission terminal 210. Because the communication device sets an upper limit of the number of drivers 228 that execute a data transmission request, an increase in load of processes can be suppressed even when the communication device 220 includes the plurality of drivers 228.

(5)

The embodiments of the present disclosure have been described above. It is to be understood that the embodiments and the details can be variously changed without deviating from the gist and scope of the present disclosure described in the claims.

The invention claimed is:

1. A communication device configured to
   receive, using a connectionless protocol, data transmitted by a transmission terminal,
   determine, in accordance with a receivable size of the communication device, a data transmission request in order to receive the data from the transmission terminal,
   calculate the receivable size based on a size of currently free capacity of a reception buffer and a size of unreceived data that has been requested in at least one previous data transmission request transmitted to the transmission terminal but is currently unreceived,
   transmit the data transmission request immediately upon determining that the receivable size is equal to or larger than a threshold value and transmit the data transmission request after a prescribed period elapses upon determining that the receivable size is smaller than the threshold value.

2. The communication device according to claim 1, wherein the connectionless protocol is a user datagram protocol (UDP).

3. The communication device according to claim 2, wherein
determining of the data transmission request includes at least one of
determining of one or more items of the data and
determining of an interval of the data transmission request to the transmission terminal, and
in a case in which the receivable size is smaller than the threshold value, the communication device reduces the number of items of the data.

4. The communication device according to claim 2, wherein
the communication device is configured to hold a plurality of drivers that at least execute a process of receiving the data, and
the communication device is configured to determine the data transmission request based on a number of free drivers that are not executing the process of receiving the data among the plurality of drivers.

5. The communication device according to claim 2, wherein
the data transmission request is determined based on at least one of
a degree of priority of an item of the data and
an interval of the data transmission request of the transmission terminal.

6. The communication device according to claim 2, wherein
the communication device is configured
to transmit the received data to another device via a network, and
to determine the data transmission request to the transmission terminal in accordance with a size of free capacity of a transmission buffer.

7. The communication device according to claim 1, wherein
determining of the data transmission request includes at least one of
determining of one or more items of the data and
determining of an interval of the data transmission request to the transmission terminal, and
in a case in which the receivable size is smaller than the threshold value, the communication device reduces the number of items of the data.

8. The communication device according to claim 7, wherein
the data transmission request is determined based on at least one of
a degree of priority of an item of the data and
an interval of the data transmission request of the transmission terminal.

9. The communication device according to claim 7, wherein
the communication device is configured
to transmit the received data to another device via a network, and
to determine the data transmission request to the transmission terminal in accordance with a size of free capacity of a transmission buffer.

10. The communication device according to claim 1, wherein
the communication device is configured to hold a plurality of drivers that at least execute a process of receiving the data, and
the communication device is configured to determine the data transmission request based on a number of free drivers that are not executing the process of receiving the data among the plurality of drivers.

11. The communication device according to claim 10, wherein
in a case in which the number of the free drivers is zero, the communication device is configured
to determine the data transmission request so as not to receive the data, and
to confirm again the number of the free drivers after a predetermined time elapses.

12. The communication device according to claim 11, wherein
the communication device is further configured to set an upper limit of the number of the drivers that execute the data transmission request.

13. The communication device according to claim 10, wherein
the communication device is further configured to set an upper limit of the number of the drivers that execute the data transmission request.

14. The communication device according to claim 1, wherein
the data transmission request is determined based on at least one of
a degree of priority of an item of the data and
an interval of the data transmission request of the transmission terminal.

15. The communication device according to claim 1, wherein
the communication device is configured
to transmit the received data to another device via a network, and
to determine the data transmission request to the transmission terminal in accordance with a size of free capacity of a transmission buffer.

* * * * *